United States Patent [19]

Reiter

[11] Patent Number: 5,123,201

[45] Date of Patent: Jun. 23, 1992

[54] SENSOR-TRIGGERED SUCTION TRAP FOR COLLECTING GRAVID MOSQUITOES

[75] Inventor: Ian P. Reiter, Santurce, P.R.

[73] Assignee: The United States of America as represented by the Department of Health and Human Services, Washington, D.C.

[21] Appl. No.: 653,338

[22] Filed: Feb. 11, 1991

[51] Int. Cl.⁵ .............................................. A01M 1/20
[52] U.S. Cl. ...................................... 43/107; 43/111; 43/121
[58] Field of Search ................ 43/107, 111, 112, 113; 340/567, 522

[56] References Cited

U.S. PATENT DOCUMENTS

| 2,300,765 | 11/1942 | Barnhart | 43/139 |
| 2,829,384 | 4/1958 | Studler | |
| 2,879,620 | 3/1959 | McGinnis | 43/113 |
| 3,214,861 | 11/1965 | Arther | 43/139 |
| 3,965,608 | 6/1976 | Schuman | 43/110 |
| 3,997,999 | 12/1976 | Evans | 43/107 |
| 4,141,174 | 2/1979 | Smith | 43/139 |
| 4,179,691 | 12/1979 | Keller | 340/567 |
| 4,275,523 | 6/1981 | Baima et al. | 43/112 |
| 4,282,673 | 8/1981 | Focks et al. | 43/113 |
| 4,411,094 | 10/1983 | Spackova et al. | 43/121 |
| 4,755,674 | 7/1988 | Schaaf | 340/567 |
| 4,794,725 | 1/1989 | Numerick | 43/139 |

OTHER PUBLICATIONS

Reiter, P., "A Revised Verison of the CDC Gravid Mosquito Trap", Journal of the American Mosquito Control Association, vol. 3, (Jun. 1987), pp. 325-327.

Reiter, P., "Operational and Scientific Notes: A Portable, Battery-Powered Trap for Collecting Gravid Culex Mosquitoes", Mosquito News, vol. 43, No. 4, (Dec. 1983), pp. 496-498.

Primary Examiner—Richard K. Seidel
Assistant Examiner—Chuck Y. Mah
Attorney, Agent, or Firm—Lowe, Price, LeBlanc & Becker

[57] ABSTRACT

A trap for collecting gravid mosquitos includes a smooth surfaced vessel containing oviposition attractant, such as an infusion of hay in water. A strip of rough material is located above the surface of the oviposition attractant. An infrared sensor adjacent the strip and above the surface of the oviposition attractant activates a trigger circuit which turns on a fan. The smooth surfaced vessel is unsuitable for oviposition by a gravid mosquito. The rough strip, however, provides a mosquito attempting to lay eggs with a good purchase above the water. When a mosquito finds the rough strip and moves towards the water, the mosquito interrupts an infrared beam. The infrared sensor activates the trigger circuit to turn on the fan for a short period. The fan produces an air flow through a suction tube to draw the mosquito through the suction tube into a collection tube. The inventive trap is fully automated, robust, and does not damage mosquitos during capture.

20 Claims, 1 Drawing Sheet

SENSOR-TRIGGERED SUCTION TRAP FOR COLLECTING GRAVID MOSQUITOES

TECHNICAL FIELD

This invention relates to method and apparatus for collection of gravid mosquitoes, particularly gravid *Aedes aegypti* mosquitoes. The trap provides a sensor to trigger suction to collect the mosquitoes from a point just above the surface of an oviposition attractant.

BACKGROUND

Ovitraps have been widely used for many years to collect the eggs of container-breeding mosquitoes (Service, M. W. (1976); In Mosquito Ecology, John Wiley Inc., New York, pp. 1-42). The CDC Gravid Mosquito Trap is the only published trap for gravid adults, but collects ovipositing *Culex* mosquitoes and operates on a different principle (see Reiter (1983), *Mosquito News* 43 (4): pp. 496-498; and Reiter (1987), *Journal of the American Mosquito Control Association* 3(2): pp. 325-327).

The problem is to collect live, adult *Aedes aegypti, Aedes albopictus,* and certain other *Aedes* mosquitoes. *Aedes aegypti* is the principal urban vector of dengue, dengue hemorrhagic fever and yellow fever throughout the tropics. The Yellow Fever Mosquito *Aedes aegypti* is an urbanized species which breeds in or close to human habitation and is the principal urban vector of dengue and yellow fever. In recent years, a massive resurgence of *Aedes aegypti* has resulted in millions of cases of dengue in the Americas, including some in the United States. An effective, efficient device for collecting live *Aedes aegypti* therefore is urgently needed for surveillance and monitoring of vector populations, for virus collections, and for the evaluation of control methods during epidemics.

*Aedes albopictus* also considered an important vector of dengue. It is an Asian species which recently invaded the United States in used tire shipments and is now common in at least 20 states. Apart for its significance as a vector, it has become a severe nuisance in many cities, such as Houston, New Orleans and Memphis. *Aedes triseriatus* is a common North American species and is the vector of LaCrosse encephalitis. All three species originally bred in tree-holes and other natural cavities, but *Aedes aegypti* (and to a certain extent *Aedes albopictus* and *Aedes triseriatus*) have adopted artificial containers in the domestic environment as their principal oviposition site.

At present, *Aedes aegypti* populations are assessed by highly subjective methods, such as counts of larva-infested sites or aspirator collections inside houses. These are so dependent on the diligence and skill of the field personnel that it is difficult to regard data as quantitative. The prior art includes a number of automated traps using a constant air flow, such as the CDC Gravid Mosquito Trap discussed above. Certain mosquitoes, however, including *Aedes aegypti,* will not fly into strong air currents. This is particularly true when seeking sites for oviposition. Consequently, the constant air flow type traps have proven ineffective for collecting gravid mosquitoes of such species.

One object of the invention therefore is to automatically collect live, adult, gravid *Aedes aegypti* mosquitoes. A non-subjective, automated method for collecting the adult mosquito would be of great value for surveillance, evaluation of control operation and many research purposes, but has never been devised. The invention seeks to provide such a method by trapping the mosquitoes as they settle to lay their eggs. In addition, it will probably be suitable for collecting other important vector species such as the Asian Tiger Mosquito *Aedes albopictus* and the Eastern Treehole Mosquito *Aedes triseriatus.*

As a further object, the collection device should not produce any substantial air flow or turbulence prior to collection since such air currents deter certain insects from entering the trap.

DISCLOSURE OF THE INVENTION

The instant invention is a trap for collecting insects. In one broad aspect, the inventive trap includes a vessel containing an attractant, a sensor for detecting the presence of an insect at a specific point in the vessel, a collector and transfer means. In response to detection of an insect by the sensor, the transfer means are activated to transfer the detected insect into said collector.

In one preferred aspect of the invention, the sensor is an electronic sensor. Also, the transfer means comprises a fan controlled in response to detection of an insect at the specific point by the electronic sensor. When activated by the sensor, the fan creates an air flow for a prescribed period to transfer the detected insect into the collector.

In the presently preferred embodiment, the sensor comprises an optical infrared transmitter and an optical infrared detector aligned to receive light from said optical transmitter. The optical detector detects the presence of an insect at the specific point by sensing an interruption of the light from the optical transmitter.

In another important aspect, the inventive trap includes a container for an attractant, a sensor for detecting the presence of an insect, a collector and transfer means. In this instance, all surfaces of the container are substantially smooth. A strip of rough material is provided on the container adjacent the surface of the attractant. The sensor is then mounted on the container adjacent the strip. In response to detection of an insect by the sensor, the transfer means are activated to transfer the detected insect into said collector.

In its most detailed structural form, the trap for collecting gravid mosquitos includes a smooth surfaced vessel containing oviposition attractant and a strip of rough material mounted on the vessel and extending above the surface of the oviposition attractant. An infrared transmitter is aligned with an infrared detector adjacent the strip above the surface of the oviposition attractant. A circuit produces a trigger signal in response to detection by the infrared detector of an interruption in the infrared transmission by said infrared transmitter. A fan is coupled to produce an air flow through a suction tube and a collecting tube. The trap further includes a motor driving the fan in response to the trigger signal, such that the air flow produced by said fan draws a mosquito from the strip through the suction tube and into the collecting tube.

In another aspect the invention is a method for collecting insects. The inventive method comprises the steps of attracting an insect to a vessel, automatically detecting the presence of an insect at a specific point in said vessel, and transferring the detected insect into a collector in response to the detection of an insect at said point.

Specifically, *Aedes* mosquitoes searching for an oviposition site are attracted to a dark vessel containing an infusion of vegetable material in water. The vessel has a smooth interior, but along the interior part of this vessel is a flat, rough surface. The mosquitoes prefer to lay their eggs on this surface, just above the meniscus of the infusion.

A subminiature photoelectric switch is aligned so the mosquitoes interrupt a narrow beam of infrared light when they arrive at this site. This operates a suction device, such as a fan, that aspirates the live insect into a collection chamber.

A trap of this kind reduces subjectivity in the surveillance of these species to a minimum. The use of a photoelectric switch, or similar automatic detection device, to initiate the air flow has the principal advantage that the insects are not deterred from entering the device by any pre-existing moving air current.

The arrangement to attract ovipositing mosquitoes is selective for the species of interest. It is also selective for mosquitoes that have already had at least one blood meal, thus increasing the possibility of encountering virus-infected individuals.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
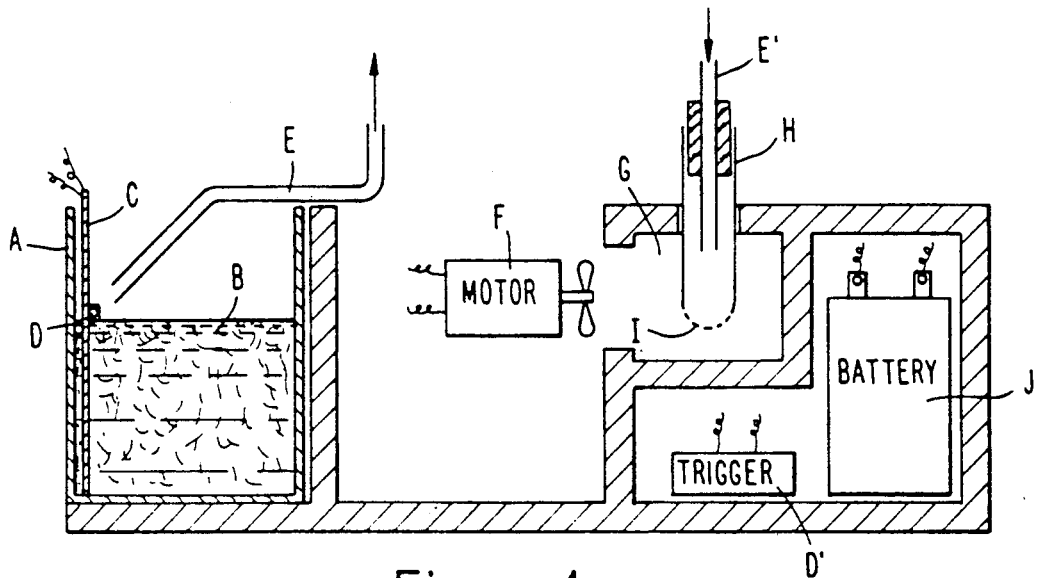
FIG. 1 is a partial sectional view of the sensor-triggered suction trap of the instant invention.

As shown in FIG. 1, the trap for collecting gravid mosquitos includes a smooth surfaced black vessel (A). Vessel (A) contains an oviposition attractant (B), such as an infusion of hay and water. Vessel (A) also contains a strip of rough material (C'). Material (C') is mounted on the vessel by means of a plate (C), and rough material (C') extends above the surface of the oviposition attractant (B).

An infrared transmitter or light source is aligned with an infrared detector (e.g. a photodiode) adjacent the strip (C') above the surface of the oviposition attractant (B). The light source and detector form a sensor/emitter system indicated at (D) in FIG. 1. A trigger circuit (D') produces a trigger signal in response to detection by the infrared detector of an interruption in the infrared transmission by said infrared transmitter.

The invention also includes a fan and motor combination (F). As shown in FIG. 1, the fan is coupled to produce an air flow through suction tubes (E/E') and the collecting tube (H). For the fan is mounted to create suction in a chamber in which the collection tube (H) is located and the collection tube (H) has a screen (I) in one end to allow air flow. The suction tubes (E/E') are connected to apply suction at the sensing point on the rough material strip (C'). Tubes (E/E") run from that point and connect to the inlet of the collection tube (H).

The trigger circuit (D') includes a timer circuit (not shown in FIG. 1) designed to turn on the fan motor for a predetermined time period, such as 1.5 seconds. The motor drives the fan in response to the trigger signal from trigger circuit (D') for this predetermined period of time. The fan thus produces an air flow through suction tubes (E/E') and collecting tube (H) and out through screen (I). This air flow lasts only long enough to draw a mosquito from the sensing point on the rough material strip (C') through the suction tubes (E/E') and into the collecting tube (H). The mosquito is trapped in collecting tube (H) by screen (I).

Power is provided by rechargeable 12 volt battery (J). Also, the components of the invention are built into a robust portable housing, as shown in FIG. 1, to facilitate field use and to protect against pilferage.

In the presently preferred embodiment, the sensor/emitter system (D) comprises an FE7A series subminiature photoelectric control unit by the Micro Switch division of Honeywell. The FE7A Series units are self-contained and require no separate amplifier for signal conditioning. Each control contains its own infrared light source, photodiode, amplifier circuitry, power supply, signal strength/alignment indicator, and output transistor. Such units also include an alignment indicator and a sensitivity adjustment. The FE7A Series units can operate on a broad range DC voltage from 10 to 28 VDC, and in the preferred embodiment the supply is 12 V battery (J).

One advantage of this embodiment is that this self-contained unit incorporates most of the necessary circuitry of trigger circuit (D') into the sensor/emitter unit itself. Only an additional timing circuit is required.

Figure 2:
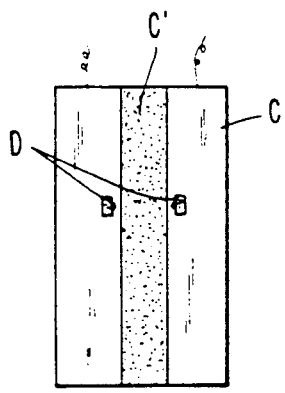
FIG. 2 shows the arrangement of the rough material strip and the light source and detector which form the sensor/emitter system.

The infrared light source and the photodiode of the FE7A unit are aligned which each other on opposite sides of the rough material strip (C') as illustrated in FIG. 2. The invention uses the FE7A control unit in its "dark" operating mode. In this mode, the output of the receiver section is energized when the light is blocked between the infrared light source and the photodiode by the gravid mosquito approaching the oviposition material along the rough surface strip.

Figure 4:
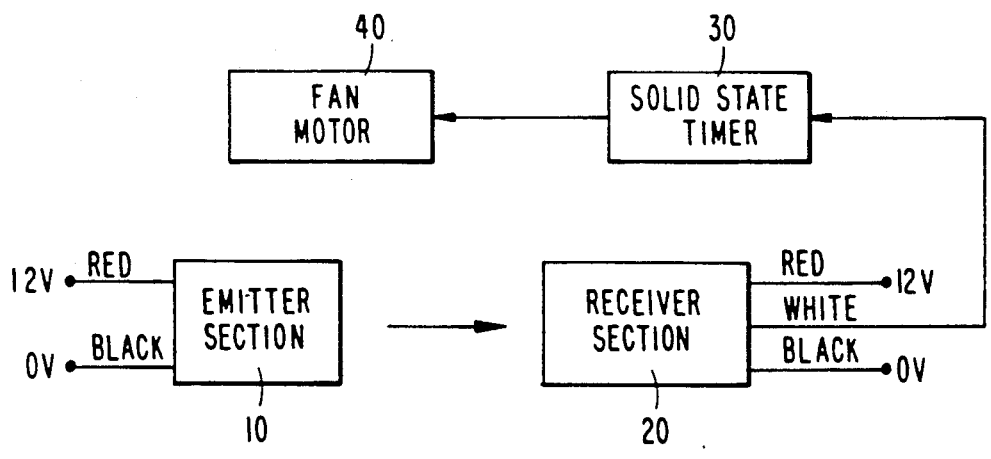
FIG. 4 is a block circuit diagram illustrating a preferred embodiment of the sensor/emitter and the trigger circuit as connected to control operation of the fan motor.

FIG. 4 is a circuit diagram illustrating use of the FE7A unit as the sensor/emitter and the trigger circuit. The red and black leads of both the emitter section 10 and the receiver section 20 are connected to the terminals of the 12 V battery (J), shown in FIG. 1. The white lead from the receiver section 20 connects to a solid state timer circuit 30. A wide variety of timer circuits known in the art could readily serve as solid state timer 30. In place of timer 30, the receiver section 20 could drive a solenoid or relay to perform the requisite timing function.

The timer 30 turns on the fan motor 40 for the desired predetermined time period, e.g. 1.5 seconds. Depending on the specific timer circuit chosen, this time period may be adjustable in the field. After the time period expires, timer 30 cuts off current to the fan motor, and the fan stops. All air currents caused by the fan in the vicinity of the trap dissipate. The trap then resumes it quiescent state awaiting entry by another mosquito.

The method of operation of the invention will now be described with reference again to FIG. 1. Mosquitoes seeking to lay their eggs are attracted to a black vessel (A) which contains the oviposition attractant (B), an infusion of hay in water. The smooth surface of the interior of the vessel is unsuitable for oviposition, but the strip of rough material (C') attached to plate (C) is ideal (FIG. 2). The mosquitoes readily find this rough material and move toward the water surface until they break the infrared beam of the sensor/emitter system (D). This triggers circuit (D'), which activates the motor and suction fan (F) for 1.5 seconds. The resultant reduction in air pressure in chamber (G) causes a sudden and rapid flow of air through screen (I), from the connecting tubing (E/E') and collecting tube (H). This snatches the mosquito from its oviposition site and transfers it to the collecting tube. After the time period expires, the fan stops and air turbulence caused by the fan dissipates.

Figure 3:
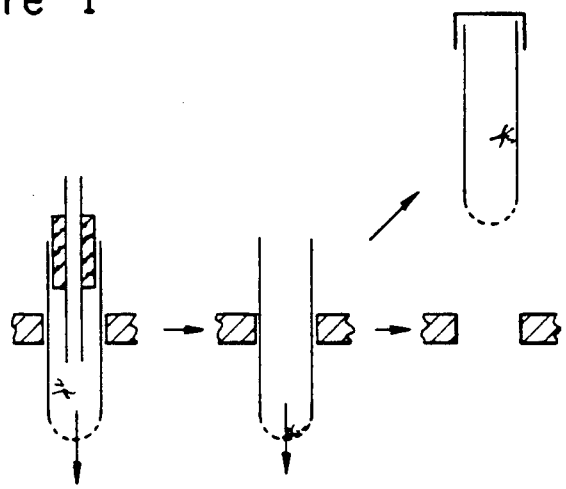
FIG. 3 illustrates the procedure for removal of the collecting tube when it contains collected insects.

As shown in FIG. 3, to remove the catch, the motor is activated by an override which enables the inlet tube (E') and its stopper to be removed while the mosquitoes are being held on the screen by suction. The collecting tube is then capped and removed.

In summary, mosquitoes are attracted to a precisely defined site—an area of rough surface with minimal air turbulence. This site is just above the water and between the infrared emitter and the sensor. The mosquitoes are then transferred by suction to a holding tube.

From the above description it becomes clear that the inventive method and apparatus provide an efficient means of collecting gravid mosquitoes. The collection method is non-subjective. Also, since air flow only starts after detection of the insect on the rough material strip, the device produces no strong air currents which might repel certain mosquitoes, such as *Aedes aegypti*, when seeking sites for oviposition.

The above detailed description of the preferred embodiments is exemplary only. Further improvements will be apparent to persons skilled in the art. For example, other forms of suction or vacuum means might be substituted for the fan and motor used to aspirate the insect from the sensing point on the rough material strip into the collecting tube. All such improvements fall within the scope of the invention which is limited only by the appended claims.

What is claimed is:

1. A trap for collecting insects, comprising:
    a vessel containing an attractant having a surface to which insects are attracted;
    a sensor mounted on said vessel for detecting that an insect is present at a specific point in said vessel just above the surface of said attractant;
    a collector; and
    transfer means, responsive to detection of an insect at said point by said sensor, for transferring the detected insect into said collector.

2. A trap for collecting insects as in claim 1, wherein said vessel comprises:
    a container for oviposition attractant, all surfaces of said container being substantially smooth; and
    a strip of rough material adjacent the surface of said oviposition attractant; wherein
    said sensor is mounted on said container adjacent said strip such that the specific point is a point on said strip.

3. A trap for collecting insects as in claim 1, wherein said sensor comprises:
    an optical transmitter; and
    an optical detector aligned to receive light from said optical transmitter; wherein
    said optical detector detects the presence of an insect at said specific point by sensing an interruption of the light from said optical transmitter.

4. A trap for collecting insects as in claim 3, wherein said optical transmitter is an infrared transmitter, and said optical detector is an infrared receiver.

5. A trap for collecting insects as in claim 1, wherein said sensor comprises an infrared sensor.

6. A trap for collecting insects as in claim 1, wherein said transfer means comprise:
    a suction tube having an inlet thereof adjacent said specific point;
    a fan producing an air flow through said suction tube to draw an insect from said specific point, through said suction tube and into said collector; and
    a motor for driving said fan.

7. A trap for collecting insects as in claim 6, further comprising:
    a trigger circuit, responsive to said sensor detecting the presence of an insect, for producing a signal to activate said motor for a prescribed period.

8. A trap for collecting insects, comprising:
    a vessel containing attractant wherein said vessel comprises:
        (i) a container for oviposition attractant, all surfaces of said container being substantially smooth, and
        (ii) a strip of rough material adjacent a surface of said oviposition attractant;
    an electronic sensor for detecting the presence of an insect at a specific point in said vessel wherein said electronic sensor is mounted on said container adjacent said strip such that the specific point is a point on said strip;
    a collector; and
    a fan controlled in response to detection of an insect at said point by said electronic sensor, for creating an air flow for a prescribed period to transfer the detected insect into said collector.

9. A trap for collecting insects as in claim 8, wherein said electronic sensor comprises an optical sensor.

10. A trap for collecting insects as in claim 9, wherein said optical sensor comprises an infrared sensor.

11. A trap for collecting insects as in claim 10, wherein said infrared sensor comprises:
    an infrared transmitter; and
    an infrared detector aligned to receive infrared radiation from said infrared transmitter; wherein
    said infrared detector detects the presence of an insect at said specific point by sensing an interruption of the infrared radiation from said infrared transmitter.

12. A trap for collecting insects as in claim 8, further comprising:
    a motor for driving said fan; and
    a trigger circuit, responsive to said sensor detecting the presence of an insect, for producing a signal to activate said motor for said prescribed period.

13. A trap for collecting insects, comprising:
    a container for attractant, all surfaces of said container being substantially smooth;
    a strip of rough material adjacent the surface of said attractant;
    a sensor, mounted on said container adjacent said strip, for detecting the presence of an insect at a specific point on said strip;
    a collector;

transfer means, responsive to detection of an insect at said point by said sensor, for transferring the detected insect into said collector.

14. A trap for collecting insects as in claim 13, wherein said sensor comprises:
   an optical transmitter; and
   an optical detector aligned to receive light from said optical transmitter; wherein
   said optical detector detects the presence of an insect at said specific point by sensing an interruption of the light from said optical transmitter.

15. A trap for collecting insects as in claim 14, wherein said optical transmitter is an infrared transmitter, and said optical receiver is an infrared receiver.

16. A trap for collecting insects as in claim 13, wherein said sensor comprises an infrared sensor.

17. A trap for collecting insects as in claim 13, wherein said transfer means comprise:
   a fan;
   a motor for driving said fan; and
   a trigger circuit, responsive to said sensor detecting the presence of an insect, for producing a signal to activate said motor for a prescribed period.

18. A trap for collecting insects as in claim 17, wherein said transfer means further comprises a suction tube having an inlet thereof adjacent said specific point; wherein said fan produces an air flow through said suction tube to draw an insect from said specific point, through said suction tube and into said collector.

19. A trap for collecting gravid mosquitos, comprising:
   a smooth surfaced vessel containing oviposition attractant;
   a strip of rough material mounted on the vessel and extending above the surface of the oviposition attractant;
   an infrared transmitter and an aligned infrared detector adjacent said strip above the surface of the oviposition attractant;
   a circuit producing a trigger signal in response to detection of an interruption in the infrared transmission by said infrared transmitter;
   a suction tube;
   a collecting tube;
   a fan coupled to produce an air flow through said suction tube and said collecting tube; and
   a motor driving said fan responsive to said trigger signal, such that the air flow produced by said fan draws a mosquito from said strip through said suction tube and into said collecting tube.

20. A method for collecting gravid insects, comprising the steps of:
   providing oviposition attractant in a vessel;
   automatically detecting that a gravid insect is present at a specific point in said vessel just above the surface of said attractant;
   in response to the detection of a gravid insect at said point, activating a fan for a prescribed period to transfer the detected gravid insect into a collector.

* * * * *